(12) United States Patent
Wandner

(10) Patent No.: US 11,479,666 B2
(45) Date of Patent: Oct. 25, 2022

(54) MINERAL-FILLED THERMOPLASTIC COMPOSITION HAVING GOOD MECHANICAL PROPERTIES

(71) Applicant: Covestro Deutschland AG, Leverkusen (DE)

(72) Inventor: Derk Erich Wandner, Odenthal (DE)

(73) Assignee: Covestro Deutschland AG, Leverkusen (DE)

( * ) Notice: Subject to any disclaimer, the term of this patent is extended or adjusted under 35 U.S.C. 154(b) by 218 days.

(21) Appl. No.: 16/762,759

(22) PCT Filed: Nov. 7, 2018

(86) PCT No.: PCT/EP2018/080474
§ 371 (c)(1),
(2) Date: May 8, 2020

(87) PCT Pub. No.: WO2019/092018
PCT Pub. Date: May 16, 2019

(65) Prior Publication Data
US 2020/0332113 A1   Oct. 22, 2020

(30) Foreign Application Priority Data

Nov. 10, 2017 (EP) .................................... 17200961

(51) Int. Cl.
| | | |
|---|---|---|
| C08L 69/00 | (2006.01) | |
| C08L 67/00 | (2006.01) | |
| C08L 23/08 | (2006.01) | |
| C08L 35/04 | (2006.01) | |
| B29C 45/00 | (2006.01) | |
| C08F 222/06 | (2006.01) | |
| B29K 23/00 | (2006.01) | |
| B29K 33/18 | (2006.01) | |
| B29K 67/00 | (2006.01) | |
| B29K 69/00 | (2006.01) | |
| B29K 509/00 | (2006.01) | |
| C08K 3/34 | (2006.01) | |
| C08K 5/50 | (2006.01) | |

(52) U.S. Cl.
CPC .......... *C08L 69/00* (2013.01); *B29C 45/0001* (2013.01); *C08F 222/06* (2013.01); *C08L 23/0815* (2013.01); *C08L 35/04* (2013.01); *C08L 67/00* (2013.01); *B29K 2023/08* (2013.01); *B29K 2033/18* (2013.01); *B29K 2067/00* (2013.01); *B29K 2069/00* (2013.01); *B29K 2509/00* (2013.01); *C08K 3/34* (2013.01); *C08K 5/50* (2013.01)

(58) Field of Classification Search
CPC ...... C08L 69/00; C08L 67/00; C08L 23/0815; C08L 35/04; C08K 3/34; C08F 222/06; B29C 45/0001
See application file for complete search history.

(56) References Cited

U.S. PATENT DOCUMENTS

| | | | |
|---|---|---|---|
| 2,991,273 | A | 7/1961 | Hechelhammer et al. |
| 2,999,835 | A | 9/1961 | Goldberg |
| 2,999,846 | A | 9/1961 | Schnell et al. |
| 3,148,172 | A | 9/1964 | Fox |
| 3,236,917 | A | 2/1966 | Natta et al. |
| 3,879,348 | A | 4/1975 | Serini et al. |
| 4,937,285 | A | 6/1990 | Wittmann et al. |
| 4,982,014 | A | 1/1991 | Freitag et al. |
| 5,097,002 | A | 3/1992 | Sakashita et al. |
| 5,202,374 | A | 4/1993 | Horn et al. |
| 5,272,236 | A | 12/1993 | Lai et al. |
| 5,278,272 | A | 1/1994 | Lai et al. |
| 5,340,905 | A | 8/1994 | Kühling et al. |
| 5,717,057 | A | 2/1998 | Sakashita et al. |
| 6,596,840 | B1 | 7/2003 | Kratschmer et al. |
| 6,740,730 | B1 | 5/2004 | Kratschmer et al. |

(Continued)

FOREIGN PATENT DOCUMENTS

| | | | |
|---|---|---|---|
| DE | 1570703 | A1 | 2/1970 |
| DE | 2036052 | A1 | 1/1972 |

(Continued)

OTHER PUBLICATIONS

International Search Report for PCT/EP2018/080474 dated Jan. 15, 2019.
International Search Report for PCT/EP2018/080675 dated Feb. 11, 2019.
Written Opinion of the International Searching Authority for PCT/EP2018/080474 dated Jan. 15, 2019.

(Continued)

*Primary Examiner* — Robert D Harlan
(74) *Attorney, Agent, or Firm* — Faegre Drinker Biddle & Reath LLP

(57) ABSTRACT

The invention relates to a composition for producing a thermoplastic moulding material, wherein the composition contains the following constituents:

A) at least one polymer selected from the group consisting of aromatic polycarbonate, aromatic polyestercarbonate and polyester, B) at least one anhydride-functionalized ethylene-α-olefin copolymer or ethylene-α-olefin terpolymer having a weight-average molecular weight Mw of 50000 to 500000 g/mol determined by high-temperature gel permeation chromatography using ortho-dichlorobenzene as solvent against polystyrene standards, C) a talc-based mineral filler, and also to a process for producing the moulding material, to the moulding material itself, to the use of the composition or of the moulding material for producing moulded articles and to the moulded articles themselves.

15 Claims, No Drawings

(56) References Cited

U.S. PATENT DOCUMENTS

| | | |
|---|---|---|
| 7,071,284 B2 | 7/2006 | Kauth et al. |
| 8,822,576 B2 | 9/2014 | Taschner et al. |
| 8,916,630 B2 | 12/2014 | Dern et al. |
| 2014/0243467 A1 | 8/2014 | Dern et al. |
| 2014/0329948 A1 | 11/2014 | Erkelenz et al. |
| 2015/0353732 A1* | 12/2015 | Wang .................... C08L 51/04 524/588 |

FOREIGN PATENT DOCUMENTS

| | | |
|---|---|---|
| DE | 2063050 A1 | 7/1972 |
| DE | 2211956 A1 | 10/1973 |
| DE | 3832396 A1 | 2/1990 |
| EP | 0315868 A2 | 5/1989 |
| EP | 0333414 A2 | 9/1989 |
| EP | 0494602 A2 | 7/1992 |
| EP | 2574642 A1 | 4/2013 |
| FR | 1561518 A | 3/1969 |
| GB | 1122003 A | 7/1968 |
| GB | 1229482 A | 4/1971 |
| GB | 1367790 A | 9/1974 |
| WO | WO-9802489 A1 | 1/1998 |
| WO | WO-200105866 A1 | 1/2001 |
| WO | WO-200105867 A1 | 1/2001 |
| WO | WO-2004063249 A1 | 7/2004 |
| WO | WO-2013045544 A1 | 4/2013 |
| WO | WO-2013045552 A1 | 4/2013 |
| WO | WO-2015189761 A1 | 12/2015 |

OTHER PUBLICATIONS

Written Opinion of the International Searching Authority for PCT/EP2018/080675 dated Feb. 11, 2019.

* cited by examiner

MINERAL-FILLED THERMOPLASTIC COMPOSITION HAVING GOOD MECHANICAL PROPERTIES

CROSS-REFERENCE TO RELATED APPLICATIONS

This application is a national stage application (under 35 U.S.C. § 371) of PCT/EP2018/080474, filed Nov. 7, 2018, which claims benefit of European Application No. 17200961.5, filed Nov. 10, 2017, both of which are incorporated herein by reference in their entirety.

The present invention relates to a thermoplastic composition, in particular to a thermoplastic polycarbonate composition, for producing a thermoplastic moulding material, to a process for producing the thermoplastic moulding material, to the moulding material itself, to the use of the composition or moulding material for producing moulded articles and to the moulded articles themselves.

Polycarbonate compositions have been known for a long time, and these materials are used to produce moulded articles for a very wide variety of applications, for example in the automobile sector, for rail vehicles, for the construction sector, in the electrical/electronics sector and in domestic appliances. By varying the amount and type of the formulation constituents the compositions and thus also the produced moulded articles may be adapted over wide ranges in terms of their thermal, rheological and mechanical properties according to the requirements for the respective application.

For some applications, particularly in the case of thin-walled components, the stiffness of moulded articles containing polycarbonate compositions is not sufficient. To increase the elastic modulus reinforcing materials such as talc, wollastonite or glass fibres are therefore added. While using talc-based mineral fillers often does not achieve as marked an increase in stiffness as for example with glass fibres, other properties are by contrast altered to a lesser extent.

However even using talc as filler often results in a deterioration in toughness properties which in turn may be at least partly compensated by addition of polymeric blend partners having low glass transition temperatures as an elastic component.

Examples of these impact modifiers used are graft polymers with a core-shell structure made of a butadiene-containing core and of a graft shell made of vinyl(co) polymer, this shell being intended to ensure (a degree of) compatibility of the modifier with the polycarbonate and with other polymer components that may be present in the mixture.

EP 0 315 868 A2 describes the use of graft polymers produced from a particulate diene rubber and a graft shell made of vinyl monomers in polycarbonate compositions. The moulding materials feature good toughness at low temperatures and good resistance to petroleum spirit.

Other types of elastomer components which do not have a core-shell structure are also employed.

WO 2013/045544 A1 discloses flame-retardant PC/ABS compositions with good impact strength, flowability and chemicals resistance. The compositions contain polycarbonates, graft polymers and a rubber-free alpha-olefin terpolymer. The moulding materials are suitable in particular for thin-walled housing parts in the electrical and electronics sector.

US 2015/0353732 A1 discloses compositions containing polycarbonate and/or polyester, optionally impact modifier and flame retardant and also a compatibilizer with a maleic anhydride-functionalized polyolefin. Improved impact strength is achieved by virtue of the compatibilizer.

WO 2013/045552 A1 discloses thermoplastic moulding materials made of polycarbonate and inorganic fillers containing from 0.01 to 0.5 parts by weight of at least one anhydride-modified alpha-olefin terpolymer and having a high level of stiffness and good toughness.

US 2014/0329948 A1 discloses impact-modified and glass-fibre-reinforced polycarbonate compositions having high stiffness and good thermal and rheological properties in conjunction with good flame retardancy. The compositions contain polycarbonate, flame retardant, glass fibres and an anhydride-modified alpha-olefin terpolymer.

WO 2015/189761 discloses thermally conductive thermoplastic compositions comprising a polymer matrix, a chemically reactive impact modifier and a thermally conductive filler. A maleic-anhydride-grafted ethylene copolymer is disclosed as chemically reactive impact modifier. The compositions feature good thermal conductivity and toughness.

However, the described filler-reinforced compositions and moulding materials from the prior art feature a toughness which remains insufficient, in particular in terms of multiaxial stress, impact strength and breaking elongation in tensile tests. Toughness could in principle be enhanced by increasing the proportion of the elastic component but this generally results in poorer processability of the moulding materials in the injection moulding process for example.

It was therefore desirable to provide mineral-reinforced compositions which on account of good melt flowability are readily processable and which simultaneously also allow production of moulded articles having a good toughness.

It was in particular desirable to provide mineral-reinforced compositions featuring a high impact strength, a high maximum force and total energy in the penetration test, a high breaking elongation and a high MVR value.

It has now been found that, surprisingly, a composition for producing a thermoplastic moulding material, wherein the composition comprises the following constituents:

A) at least one polymer selected from the group consisting of aromatic polycarbonate and aromatic polyestercarbonate, B) at least one anhydride-functionalized ethylene-α-olefin copolymer or ethylene-α-olefin terpolymer having a weight-average molecular weight Mw of 50000 to 500000 g/mol, preferably 100000 to 400000 g/mol and particularly preferably of 150000 to 350000 g/mol, in each case determined by high-temperature gel permeation chromatography using ortho-dichlorobenzene as solvent against polystyrene standards, C) at least one talc-based mineral filler,
exhibits the advantageous properties.
The compositions preferably comprise
40% to 98.9% by weight, more preferably 50% to 90% by weight, particularly preferably 60% to 85% by weight, of the component A,
0.1% to 10% by weight, more preferably 0.5% to 9% by weight, particularly preferably 1% to 8% by weight, of the component B,
1% to 40% by weight, preferably 5% to 35% by weight, particularly preferably 10% to 25% by weight, of the component C, and
0% to 20% by weight, more preferably 0.1% to 15% by weight, particularly preferably 0.2% to 10% by weight, of further polymeric constituents and/or polymer additives as component D.

In a preferred embodiment the compositions consist to an extent of at least 90% by weight of the components A to D. It is most preferable when the compositions consist only of the components A to D.

It is possible for the maleic anhydride groups of the component B to enter into chemical reactions with the component A and/or with other components of the composition.

The maleic anhydride groups may also enter into chemical reactions with moisture or with other impurities.

Such reactions occur in particular in the melt at high temperatures such as those that prevail during melt compounding (e.g. in an extruder) and injection moulding.

This reduces the proportion of maleic anhydride groups. In the context of the present patent application moulding materials according to the invention are to be understood as also including those obtained when the components A, B, C and optionally D are physically mixed and subjected to melt compounding.

Component A

Polycarbonates in the context of the present invention include not only homopolycarbonates but also copolycarbonates and/or polyestercarbonates; the polycarbonates may be linear or branched in known fashion. Also employable according to the invention are mixtures of polycarbonates.

The thermoplastic polycarbonates including the thermoplastic aromatic polyestercarbonates have weight-average molecular weights $M_w$ determined by GPC (gel permeation chromatography in methylene chloride with a polycarbonate standard) of 15 000 g/mol to 50 000 g/mol, preferably of 20 000 g/mol to 35 000 g/mol, in particular of 23 000 g/mol to 33 000 g/mol.

A portion, up to 80 mol %, preferably from 20 mol % to 50 mol %, of the carbonate groups in the polycarbonates used in accordance with the invention may have been replaced by aromatic dicarboxylic ester groups. Such polycarbonates, which contain both acid radicals of carbonic acid and acid radicals of aromatic dicarboxylic acids incorporated into the molecular chain, are referred to as aromatic polyestercarbonates. In the context of the present invention they are subsumed by the umbrella term "thermoplastic aromatic polycarbonates".

The polycarbonates are produced in known fashion from diphenols, carbonic acid derivatives, optionally chain terminators and optionally branching agents, wherein for the production of the polyestercarbonates a portion of the carbonic acid derivatives is replaced by aromatic dicarboxylic acids or derivatives of the dicarboxylic acids according to the extent to which the carbonate structural units are to be replaced by aromatic dicarboxylic ester structural units in the aromatic polycarbonates.

Dihydroxyaryl compounds suitable for producing polycarbonates include those of formula (1)

HO—Z—OH     (1), in which
Z is an aromatic radical which has 6 to 30 carbon atoms and may contain one or more aromatic rings, may be substituted and may contain aliphatic or cycloaliphatic radicals or alkylaryls or heteroatoms as bridging elements.

It is preferable when Z in formula (1) represents a radical of formula (2)

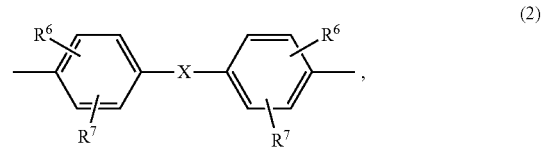

(2)

in which
$R^6$ and $R^7$ independently of one another represent H, $C_1$- to $C_{18}$-alkyl-, $C_1$- to $C_{18}$-alkoxy, halogen such as Cl or Br or in each case optionally substituted aryl or aralkyl, preferably H or $C_1$- to $C_{12}$-alkyl, particularly preferably H or $C_1$- to $C_8$-alkyl and very particularly preferably H or methyl, and
X represents a single bond, —$SO_2$—, —CO—, —O—, —S—, $C_1$- to $C_6$-alkylene, $C_2$- to $C_5$-alkylidene or $C_5$- to $C_6$-cycloalkylidene which may be substituted by $C_1$- to $C_6$-alkyl, preferably methyl or ethyl, or else represents $C_6$- to $C_{12}$-arylene which may optionally be fused to further aromatic rings containing heteroatoms.

It is preferable when X represents a single bond, $C_1$- to $C_5$-alkylene, $C_2$- to $C_5$-alkylidene, $C_5$- to $C_6$-cycloalkylidene, —O—, —SO—, —CO—, —S—, —$SO_2$— or a radical of formula (2a)

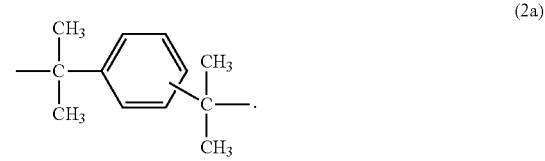

(2a)

Examples of dihydroxyaryl compounds (diphenols) are: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulfides, bis(hydroxyphenyl) sulfones, bis(hydroxyphenyl) sulfoxides, 1,1'-bis(hydroxyphenyl)diisopropylbenzenes and the ring-alkylated and ring-halogenated compounds thereof.

Diphenols suitable for producing the polycarbonates for use in accordance with the invention are for example hydroquinone, resorcinol, dihydroxydiphenyl, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)diisopropylbenzenes and the alkylated, ring-alkylated and ring-halogenated compounds thereof.

Preferred diphenols are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC).

Particularly preferred diphenols are 4,4'-dihydroxydiphenyl, 1,1-bis(4-hydroxyphenyl)phenylethane, 2,2-bis(4-hydroxyphenyl)propane (bisphenol A), 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC). 2,2-Bis(4-hydroxyphenyl)propane (bisphenol A) is especially preferred.

These and further suitable diphenols are described, for example, in U.S. Pat. Nos. 2,999,835 A, 3,148,172 A, 2,991,273 A, 3,271,367 A, 4,982,014 A and 2,999,846 A, in German published specifications 1 570 703 A, 2 063 050 A, 2 036 052 A, 2 211 956 A and 3 832 396 A, in French patent specification 1 561 518 A1, in the monograph "H. Schnell, Chemistry and Physics of Polycarbonates, Interscience Publishers, New York 1964, p. 28 ff.; p. 102 ff.", and in "D. G. Legrand, J. T. Bendier, Handbook of Polycarbonate Science and Technology, Marcel Dekker New York 2000, p. 72ff.".

In the case of the homopolycarbonates, only one diphenol is used; in the case of copolycarbonates, two or more diphenols are used. The diphenols employed, similarly to all other chemicals and assistants added to the synthesis, may be contaminated with the contaminants from their own synthesis, handling and storage. However, it is desirable to use raw materials of the highest possible purity.

The monofunctional chain terminators required for molecular-weight regulation, for example phenols or alkylphenols, in particular phenol, p-tert-butylphenol, isooctylphenol, cumylphenol, chlorocarbonic esters thereof or acyl chlorides of monocarboxylic acids or mixtures of these chain terminators, are either supplied to the reaction with the bisphenolate(s) or else are added at any desired juncture in the synthesis provided that phosgene or chlorocarbonic acid end groups are still present in the reaction mixture or, in the case of acyl chlorides and chlorocarbonic esters as chain terminators, as long as sufficient phenolic end groups of the resulting polymer are available. However, it is preferable when the chain terminator(s) is/are added after the phosgenation at a location or at a juncture at which phosgene is no longer present but the catalyst has not yet been added or when they are added before the catalyst or together or in parallel with the catalyst.

Any branching agents or branching agent mixtures to be used are added to the synthesis in the same way, but typically before the chain terminators. Typically, trisphenols, quaterphenols or acid chlorides of tri- or tetracarboxylic acids are used, or else mixtures of the polyphenols or the acid chlorides.

Some of the compounds having three or more than three phenolic hydroxyl groups that are usable as branching agents are, for example, phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tris(4-hydroxyphenyl)benzene, 1,1,1-tri(4-hydroxyphenyl)ethane, tris(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The amount of branching agents for optional use is from 0.05 mol % to 2 mol %, in turn based on moles of diphenols used in each case.

The branching agents can either be initially charged with the diphenols and the chain terminators in the aqueous alkaline phase or added dissolved in an organic solvent before the phosgenation.

All of these measures for producing polycarbonates are familiar to those skilled in the art.

Aromatic dicarboxylic acids suitable for the production of the polyestercarbonates are, for example, orthophthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenyl sulfone dicarboxylic acid, 2,2-bis(4-carboxyphenyl)propane, trimethyl-3-phenylindane-4,5'-dicarboxylic acid.

Among the aromatic dicarboxylic acids, particular preference is given to using terephthalic acid and/or isophthalic acid.

Derivatives of dicarboxylic acids include dicarbonyl dihalides and dialkyl dicarboxylates, in particular dicarbonyl dichlorides and dimethyl dicarboxylates.

Replacement of the carbonate groups by the aromatic dicarboxylic ester groups proceeds essentially stoichiometrically and also quantitatively and the molar ratio of the reaction partners is therefore also reflected in the final polyestercarbonate. The aromatic dicarboxylic ester groups can be incorporated either randomly or blockwise.

Preferred modes of production of the polycarbonates, including the polyestercarbonates, to be used according to the invention are the known interfacial process and the known melt transesterification process (cf. e.g. WO 2004/063249 A1, WO 2001/05866 A1, WO 2000/105867, U.S. Pat. Nos. 5,340,905 A, 5,097,002 A, 5,717,057 A).

In the former case the acid derivatives used are preferably phosgene and optionally dicarbonyl dichlorides; in the latter case preferably diphenyl carbonate and optionally dicarboxylic diesters. Catalysts, solvents, workup, reaction conditions, etc. for polycarbonate production/polyestercarbonate production are in both cases sufficiently described and known.

In a preferred embodiment only aromatic polycarbonate is used as component A, most preferably an aromatic polycarbonate comprising bisphenol A as the diphenol unit.

Component B

Employed as component B are ethylene-α-olefin copolymers or terpolymers having grafted-on anhydride groups. In the context of this patent application the component B is also referred to as ethylene-α-olefin copolymer or terpolymer functionalized with anhydride groups.

The anhydride is preferably selected from the group comprising maleic anhydride, phthalic anhydride, fumaric anhydride and itaconic anhydride and mixtures thereof. A particularly preferred anhydride is maleic anhydride.

In addition to ethylene the copolymers or terpolymers preferably comprise the comonomers (α-olefin) 1-propene, 1-butene, 1-isobutene, 1-pentene, 1-hexene, 1-heptene, 1-octene, 1-nonene, 1-decene, 1-undecene, 1-dodecene, 1-tridecene, 1-tetradecene, 1-octadecene, 1-nonadecene or mixtures thereof.

Employed in particular is a copolymer of ethylene and 1-octene.

The olefinic copolymers can be produced as described in U.S. Pat. Nos. 5,272,236 A and 5,278,272 A.

Grafting with anhydride groups is described in U.S. Pat. No. 323,691 A for example.

The α-olefin comonomer content is preferably 2 to 40 mol %, preferably 5 to 35 mol % and particularly preferably 10 to 25 mol %, in each case based on the sum of ethylene and the comonomer or comonomers.

The ethylene-α-olefin copolymers or terpolymers described are preferably random copolymers.

The copolymers or terpolymers having grafted-on anhydride groups may be subjected to incipient crosslinking as described in WO 98/02489 in order to optimize elastomeric properties.

The proportions of ethylene and of the comonomers may be determined by and $^{13}C$ NMR spectroscopy in trichloroethane as solvent.

The anhydride-modified polymer is preferably characterized by the following composition:

B(1) 90.0% to 99.99% by weight, more preferably 97.0% to 99.9% by weight, particularly preferably 98.0% to 99.7% by weight, very particularly preferably 99.0% to 99.5% by weight, of copolymer or terpolymer, B(2) 0.01% to 10.0% by weight, more preferably 0.1% to 3.0% by weight, particularly preferably 0.3% to 2.0% by weight, very particularly preferably 0.5% to 1.0% by weight, of anhydride.

In a further-preferred embodiment the main chain of the component B consists of a random copolymer of ethylene and 1-octene units.

The anhydride-modified copolymer or terpolymer has a weight-average molecular weight Mw of more than 50000 to 500000 g/mol, preferably 100000 to 400000 g/mol and particularly preferably of 150000 to 350000 g/mol, in each case determined by HT-GPC (high-temperature gel permeation chromatography) using ortho-dichlorobenzene as solvent against polystyrene standards.

The glass transition temperature of the preferred products is not more than −50° C.

The glass transition temperature is determined by differential scanning calorimetry (DSC) according to the standard DIN EN 61006 (2004 version) at a heating rate of 10 K/min, $T_g$ being defined as the mid-point temperature (tangent method).

Component C

The compositions contain as component C at least one talc-based mineral filler.

Suitable as talc-based mineral fillers in the context of the invention are any particulate fillers that the person skilled in the art associates with talc or talcum. Also suitable are all particulate fillers that are commercially available and whose product descriptions contain as characterizing features the terms talc or talcum.

Preference is given to mineral fillers having a content of talc according to DIN 55920 of more than 50% by weight, preferably more than 80% by weight, particularly preferably more than 95% by weight and especially preferably more than 98% by weight based on the total mass of the filler.

Talc is to be understood as meaning a naturally occurring or synthetically produced talc.

Pure talc has the chemical composition 3 $MgO$ 4 $SiO_2 \cdot H_2O$ and thus has an MgO content of 31.9% by weight, an $SiO_2$ content of 63.4% by weight and a content of chemically bonded water of 4.8% by weight. It is a silicate having a layered structure.

Naturally occurring talc materials generally do not have the above-recited ideal composition since they are contaminated through partial replacement of the magnesium by other elements, through partial replacement of silicon by aluminium for example and/or through intergrowth with other minerals, for example dolomite, magnesite and chlorite.

It is advantageous when in the composition according to the invention the component E contains or consists of talc (E2), wherein the talc has an MgO content of 28% to 35% by weight, in particular of 30.5% to 32% by weight, an $SiO_2$ content of 55% to 65% by weight and an $Al_2O_3$ content of less than 1% by weight. In compositions comprising such a component E it has been found that in particular degradation reactions at the polycarbonate that are brought about by processing occur only to a small extent.

Also advantageous and thus preferred is in particular the use of the talc according to the invention in the form of finely ground grades having an average particle size $d_{50}$ of 0.1 to 20 μm, preferably 0.2 to 10 μm, more preferably 0.3 to 5 μm, yet more preferably 0.3 to 2.5 μm, and very particularly preferably 0.4 to 1.0 μm.

The talc-based mineral fillers for use in accordance with the invention preferably have an upper particle size or grain size $d_{95}$ of less than 10 μm, preferably less than 7 μm, particularly preferably less than 6 μm and especially preferably less than 4.5 μm. The $d_{95}$ and $d_{50}$ values of the fillers are determined by SEDIGRAPH D 5 000 sedimentation analysis according to ISO 13317-3.

The talc-based mineral fillers may optionally have been subjected to a surface treatment to achieve better coupling to the polymer matrix. They may for example have been provided with an adhesion promoter system based on functionalized silanes The average aspect ratio (diameter to thickness) of the talc-based mineral fillers is preferably in the range 1 to 100, particularly preferably 2 to 25 and especially preferably 5 to 25, determined by electron micrographs of ultrathin sections of the finished products and measurement of a representative amount (about 50) of filler particles.

As a result of the processing to afford the moulding material/moulded articles the talc-based mineral fillers may have a smaller $d_{95}/d_{50}$ in the moulding material/in the moulded article than the originally employed fillers.

Component D

The composition may contain as component D one or more further additives preferably selected from the group consisting of flame retardants (for example organic phosphorus or halogen compounds, in particular bisphenol-A-based oligophosphate), anti-drip agents (for example compounds from the substance classes of fluorinated polyolefins, silicones, and also aramid fibres), flame retardant synergists (for example nanoscale metal oxides), smoke inhibitors (for example zinc borate), lubricants and demoulding agents (for example pentaerythritol tetrastearate), nucleating agents, antistats, conductivity additives, stabilizers (e.g. hydrolysis, heat-ageing and UV stabilizers, and also transesterification inhibitors and acid/base quenchers), flow promoters, compatibilizers, further polymeric constituents (for example polyesters, vinyl (co)polymers or functional blend partners), fillers and reinforcers distinct from component C (for example carbon fibres, glass fibres, mica, kaolin, $CaCO_3$) and also dyes and pigments (for example titanium dioxide or iron oxide).

In a preferred embodiment the composition is free from flame retardants, anti-drip agents, flame retardant synergists and smoke inhibitors.

In a preferred embodiment the composition contains at least one polymer additive selected from the group consisting of lubricants and demoulding agents, stabilizers, flow promoters, compatibilizers, other polymeric constituents, dyes and pigments.

In a preferred embodiment the composition contains pentaerythritol tetrastearate as a demoulding agent.

In a preferred embodiment the composition contains as a stabilizer at least one representative selected from the group consisting of sterically hindered phenols, organic phosphites, sulfur-based co-stabilizers and organic and inorganic Brønsted acids.

A preferably employed Brønsted acid is citric acid.

In a particularly preferred embodiment the composition contains as a stabilizer at least one representative selected from the group consisting of octadecyl 3-(3,5-di-tert-butyl-4-hydroxyphenyl)propionate and tris(2,4-di-tert-butylphenyl) phosphite.

In an especially preferred embodiment the composition contains as a stabilizer a combination of octadecyl 3-(3,5-di-tert-butyl-4-hydroxyphenyl)propionate and tris(2,4-di-tert-butylphenyl) phosphite.

Particularly preferred compositions contain pentaerythritol tetrastearate as a demoulding agent, at least one representative selected from the group consisting of octadecyl 3-(3,5-di-tert-butyl-4-hydroxyphenyl)propionate and tris(2,4-di-tert-butylphenyl) phosphite and citric acid as a stabilizer.

Production of the Moulding Materials and Moulded Articles

The compositions according to the invention can be used to produce thermoplastic moulding materials.

The thermoplastic moulding materials according to the invention may be produced for example by mixing the respective constituents of the compositions and melt compounding and melt extruding the resulting mixture at temperatures of preferably 200° C. to 320° C., particularly preferably at 240° C. to 300° C., in customary apparatuses such as for example internal kneaders, extruders and twin-shaft screw systems in a known manner. In the context of this application, this process is generally referred to as compounding.

In this process at least the component A is melted, all of the constituents of the composition are dispersed and/or dissolved in one another and in a further step the resultant melt is resolidified by cooling and optionally pelletized. The steps of solidification and pelletization may be performed in any desired sequence relative to one another.

The term moulding material is thus to be understood as meaning the product obtained when the constituents of the composition are melt-compounded and melt-extruded.

The mixing of the individual constituents of the compositions may be carried out in a known manner, either successively or simultaneously, and either at about 20° C. (room temperature) or at a higher temperature. It is therefore possible for example for some of the constituents to be added via the main intake of an extruder and for the remaining constituents to be supplied later in the compounding process via an ancillary intake, for example via an ancillary extruder.

The invention also provides a process for producing the moulding materials according to the invention.

Preference is given to a process in which the polycarbonate melt and the additives are added via the main intake of the twin-screw extruder and the talc-based mineral filler is added into a zone downstream of the melting zone via an ancillary intake. To ensure the best possible stabilization and processability of the polycarbonate the addition of the filler should be effected at the latest possible juncture in the compounding without, however, preventing sufficient dispersion of the filler due to insufficient residence time and mixing effect.

The moulding materials according to the invention may be used to produce moulded articles of any kind. These may be produced by injection moulding, extrusion and blow-moulding processes for example. A further form of processing is the production of moulded articles by deep drawing from previously produced sheets or films.

The constituents of the compositions may also be metered into an injection moulding machine or into an extrusion unit and processed into moulded articles directly.

Examples of such moulded articles that can be produced from the compositions and moulding materials according to the invention are films, profiles, housing parts of any type, for example for domestic appliances such as juice presses, coffee machines, mixers; for office machinery such as monitors, flatscreens, notebooks, printers, copiers; sheets, pipes, electrical installation ducts, windows, doors and other profiles for the construction sector (internal fitout and external applications), and also electrical and electronic components such as switches, plugs and sockets, and component parts for commercial vehicles, in particular for the automotive sector. The compositions and moulding materials according to the invention are also suitable for production of the following moulded articles or mouldings: internal fitout parts for rail vehicles, ships, aircraft, buses and other motor vehicles, bodywork components for motor vehicles, housings of electrical equipment containing small transformers, housings for equipment for the processing and transmission of information, housings and facings for medical equipment, massage equipment and housings therefor, toy vehicles for children, sheetlike wall elements, housings for safety equipment, thermally insulated transport containers, moulded parts for sanitation and bath equipment, protective grilles for ventilation openings and housings for garden equipment.

Further embodiments 1 to 28 of the present invention are described hereinbelow:

1. Composition for producing a thermoplastic moulding material, wherein the composition contains or consists of the following constituents:

A) at least one polymer selected from the group consisting of aromatic polycarbonate, aromatic polyestercarbonate and polyester, B) at least one anhydride-functionalized ethylene-α-olefin copolymer or ethylene-α-olefin terpolymer having a weight-average molecular weight Mw of 50000 to 500000 g/mol determined by high-temperature gel permeation chromatography using ortho-dichlorobenzene as solvent against polystyrene standards, C) a talc-based mineral filler.

2. Composition according to embodiment 1, wherein the component B comprises 2 to 40 mol % of α-olefin units and 60 to 98 mol % of ethylene units based on the sum of α-olefin and ethylene.

3. Composition according to embodiment 1, wherein the component B comprises 5 to 35 mol % of α-olefin units and 65 to 95 mol % of ethylene units based on the sum of α-olefin and ethylene.

4. Composition according to embodiment 1, wherein the component B comprises 10 to 25 mol % of α-olefin units and 75 to 90 mol % of ethylene units based on the sum of α-olefin and ethylene.

5. Composition according to any of the preceding embodiments, wherein the component B has a content of anhydride of 0.01% to 10.0% by weight.

6. Composition according to any of the preceding embodiments, wherein the component B has a content of anhydride of 0.1% to 3.0% by weight.

7. Composition according to any of the preceding embodiments, wherein the component B has a content of anhydride of 0.3% to 2.0% by weight.

8. Composition according to any of the preceding embodiments, wherein the component B has a content of anhydride of 0.5% to 1.0% by weight.

9. Composition according to any of the preceding embodiments, wherein the component B is a maleic anhydride-functionalized copolymer of ethylene and 1-octene.

10. Composition according to any of the preceding embodiments, wherein the component B has a weight-average molecular weight Mw of 100 000 to 400 000 g/mol.

11. Composition according to any of the preceding embodiments, wherein the component B has a weight-average molecular weight Mw of 150 000 to 350 000 g/mol.

12. Composition according to any of the preceding embodiments, wherein the component A consists solely of aromatic polycarbonate.

13. Composition according to any of the preceding embodiments, wherein talc is employed as component C.

14. Composition according to embodiment 13, wherein the talc has an average particle size $d_{50}$ of 0.3 to 5 μm.

15. Composition according to embodiment 14, wherein the talc has an average particle size $d_{50}$ of 0.3 to 2.5 μm.

16. Composition according to embodiment 14, wherein the talc has an average particle size $d_{50}$ of 0.4 to 1.0 μm.

17. Composition according to any of the preceding embodiments, containing or consisting of 40% to 98.9% by weight of the component A,
0.1% to 10% by weight of the component B,
1% to 40% by weight of the component C,
0% to 20% by weight of further polymeric constituents and/or polymer additives as component D.

18. Composition according to any of the preceding embodiments, containing or consisting of 50% to 90% by weight of the component A,
0.5% to 9% by weight of the component B,
5% to 35% by weight of the component C,
0.1% to 15% by weight of further polymeric constituents and/or polymer additives as component D.

19. Composition according to any of the preceding embodiments, containing or consisting of
60% to 85% by weight of the component A,
1% to 8% by weight of the component B,
10% to 25% by weight of the component C,
0.2% to 10% by weight of further polymeric constituents and/or polymer additives as component D.

20. Composition according to any of the preceding embodiments, wherein the component D comprises at least one stabilizer selected from the group of phenolic antioxidants, phosphites and Brønsted acids.

21. Process for producing moulding materials, containing the steps (i), (ii) and optionally (iii), wherein in a first step (i)
a composition according to any of embodiments 1 to 18 is heated by introduction of thermal and/or mechanical energy, at least the component A) is thus melted and all employed components are dispersed and/or dissolved in one another
and
in a further step (ii)
the melt resulting from process step (i) is (ii) resolidified by cooling
and (iii) optionally pelletized,
wherein the process steps (ii) and (iii) may be performed in any desired sequence relative to one another.

22. Process according to embodiment 21, wherein the step (i) is performed at a temperature of 200° C. to 320° C.

23. Process according to embodiment 21, wherein the step (i) is performed at a temperature of 240° C. to 300° C.

24. Process according to any of embodiments 21 to 23, wherein the process is performed with a compounding unit and the component C is added separately from the other components.

25. Process according to embodiment 24, wherein the compounding unit used is a twin-screw extruder and the component C is added into a zone downstream of the melting zone for the other components via an ancillary intake.

26. Moulding material obtained or obtainable by a process according to any of embodiments 21 to 25.

27. Use of a composition according to any of embodiments 1 to 20 or of a moulding material according to embodiment 26 for producing moulded articles.

28. Moulded article obtainable from a composition according to any of embodiments 1 to 20 or from a moulding material according to embodiment 26.

EXAMPLES

Components Employed
Component A:
A1: Linear polycarbonate based on bisphenol A having a weight-average molecular weight $M_w$ of 28000 g/mol determined by gel permeation chromatography in methylene chloride with a polycarbonate standard.
Component B:
B1: Maleic anhydride (MAH)-functionalized ethylene-1-octene copolymer having an MAH content of 0.8% by weight and a ratio of ethylene to 1-octene of 87 mol % to 13 mol % and a weight-average molecular weight $M_w$ of 200 000 g/mol (Paraloid™ EXL 3808 D from Dow Chemical).
B2: Maleic anhydride (MAH)-functionalized ethylene-1-octene copolymer having an MAH content of 0.4% by weight and a ratio of ethylene to 1-octene of 83 mol % to 17 mol % and a weight-average molecular weight $M_w$ of 322 000 g/mol (Paraloid™ EXL 3815 from Dow Chemical).
B3 (comparison): Ethylene-propylene-octene-maleic anhydride copolymer having an ethylene:propylene:octene ratio in % by weight of 87:6:7 (corresponds to 94:4:2 in mol %), CAS No. 31069-12-2, having a molecular weight Mw of 5000 g/mol determined by GPC with a polystyrene standard and a maleic anhydride proportion of 4.4% by weight, HiWax™ 1105 A (from Mitsui Chemicals).
B4 (comparison): Kane ACE™ M732, impact modifier having core-shell structure and a butadiene rubber core (from Kaneka).
Component C:
Talc, HTP Ultra™ from Imi Fabi having an MgO content of 31.0% by weight, an $SiO_2$ content of 61.5% by weight and an $Al_2O_3$ content of 0.4% by weight, average particle size $d_{50}$=0.65 μm.
Component D:
D1: Heat stabilizer, Irganox™ B900 (mixture of 80% Irgafos™ 168 (tris(2,4-di-tert-butylphenyl) phosphite) and 20% Irganox™ 1076 (2,6-di-tert-butyl-4-(octadecanoxycarbonylethyl)phenol); BASF (Ludwigshafen, Germany).
D2: Demoulding agent pentaerythritol tetrastearate.
D3: Citric acid, purity≥99.5% from Acros Organics (Geel, Belgium).

Production and Testing of the Moulding Materials According to the Invention

The mixing of the components was carried out in a Leistritz ZSE-27Maxx twin-screw extruder at a melt temperature of 260° C. In experiments 5, 6, V7 and V8 the talc was added into a zone downstream of the melting zone for the other components via an ancillary intake.

The moulded articles were produced at a melt temperature of 300° C. and a mould temperature of 80° C. in an Arburg 270 E injection moulding machine.

MVR is determined according to ISO 1133 (2012 version) at 300° C. using a loading of 1.2 kg and a melting time of 5 minutes.

The Charpy impact strength was determined at 23° C. and −30° C. according to ISO 179/1eU on 10 test specimens having dimensions of 80 mm×10 mm×4 mm in each case.

The breaking elongation and the nominal breaking elongation were determined at room temperature according to ISO 527 (1996 version).

Used as a further measure of ductility in the practice-relevant impact/crash test was the behaviour in the multi-axial penetration test. The penetration test was performed at 23° C. based on ISO 6603-2 (2000 version; "based on" means that no visual check of the test specimens was performed) using test specimens having dimensions of 60 mm×60 mm×2 mm.

impact strength and also maximum force and total energy in the penetration test are lower. When using the elastic component B3 the impact strength is similar to that obtained with B1 or B2 but toughness in the penetration test is markedly impaired.

Also particularly advantageous when using the component B1 are the markedly improved breaking elongation and nominal breaking elongation.

Furthermore, examples 5 and 6 show that addition of the talc-based mineral filler via an ancillary intake brings about a marked improvement in breaking elongation and nominal breaking elongation in the inventive compositions. While the comparative examples V7 and V8 also show an advantage from addition via an ancillary intake, the enhancements in breaking elongation and nominal breaking elongation are markedly less pronounced.

The invention claimed is:

1. A composition for producing a thermoplastic moulding material, wherein the composition consists of the following constituents:
   A) at least one polymer selected from the group consisting of aromatic polycarbonate, aromatic polyestercarbonate and polyester,
   B) at least one anhydride-functionalized ethylene-α-olefin copolymer or ethylene-a-olefin terpolymer having a weight-average molecular weight Mw of 50000 to

TABLE 1

Compositions and properties thereof

| | | 1 | 2 | V3 | V4 | 5 | 6 | V7 | V8 |
|---|---|---|---|---|---|---|---|---|---|
| Component (% by wt.) | | | | | | | | | |
| A1 | | 74.40 | 74.40 | 74.40 | 74.40 | 74.40 | 74.40 | 74.40 | 74.40 |
| B1 | | 5.00 | | | | 5.00 | | | |
| B2 | | | 5.00 | | | | 5.00 | | |
| B3 | | | | 5.00 | | | | 5.00 | |
| B4 | | | | | 5.00 | | | | 5.00 |
| C | | 20.00 | 20.00 | 20.00 | 20.00 | 20.00 | 20.00 | 20.00 | 20.00 |
| D1 | | 0.10 | 0.10 | 0.10 | 0.10 | 0.10 | 0.10 | 0.10 | 0.10 |
| D2 | | 0.40 | 0.40 | 0.40 | 0.40 | 0.40 | 0.40 | 0.40 | 0.40 |
| D3 | | 0.10 | 0.10 | 0.10 | 0.10 | 0.10 | 0.10 | 0.10 | 0.10 |
| Talc addition | | | | | | | | | |
| Main intake (MI) or ancillary intake (AI) | | MI | MI | MI | MI | AI | AI | AI | AI |
| Properties | | | | | | | | | |
| Charpy impact strength | | | | | | | | | |
| Number fractured/unfractured (23° C.) | | 0/10 | 0/10 | 0/10 | 10/0 | 0/10 | 0/10 | 3/7 | 10/0 |
| Average for fractured bars (23° C.) | kJ/m² | n.f. | n.f. | n.f. | 107 | n.f. | n.f. | 187/n.f. | 69 |
| Number fractured/unfractured (−30° C.) | | 10/0 | 10/0 | 10/0 | 9/0 | 10/0 | 10/0 | 10/0 | 10/0 |
| Average for fractured bars (−30° C.) | kJ/m² | 214 | 230 | 231 | 90 | 209 | 190 | 179 | 75 |
| Penetration | | | | | | | | | |
| Maximum force (23° C.) | N | 4452 | 4329 | 1100 | 3694 | 4276 | 4250 | 1201 | 3788 |
| Total energy (23° C.) | J | 36 | 34 | 7 | 22 | 30 | 30 | 4 | 19 |
| Tensile test | | | | | | | | | |
| Breaking elongation | % | 14.5 | 3.1 | 2.8 | 3.0 | 88.3 | 86.7 | 15.6 | 6.7 |
| Nominal breaking elongation | % | 8.3 | 3.3 | 3.1 | 3.5 | 60.3 | 58.5 | 8.7 | 5.0 |
| MVR (1.2 kg - 5 min, 300° C.) | cm3/[10 min] | 6.5 | 7.6 | 14.7 | 6.5 | 6.7 | 8.9 | 15.5 | 8.2 | n.f.: not fractured

The data from table 1 show that the compositions 1, 2, 5 and 6 according to the invention containing the components B1 and B2 can be used to produce moulding materials having good melt flowability (MVR value not impaired compared to V4) and moulded articles having good toughness in impact tests, penetration tests and in tensile tests. When a graft polymer having a core-shell structure is employed (B4) instead of the inventive component B1/B2, 500000 g/mol determined by high-temperature gel permeation chromatography using ortho-dichlorobenzene as solvent against polystyrene standards,
   C) a talc-based mineral filler, and
   D) a polymer additive selected from the group consisting of flame retardants, anti-drip agents, flame retardant synergists, smoke inhibitors, lubricants, demoulding agents, nucleating agents, antistats, conductivity additives, stabilizers, flow promoters, compatibilizers, fillers and reinforcers distinct from component C, dyes and pigments.

2. The composition according to claim 1, wherein the component B consists of 2 to 40 mol % of α-olefin units and 60 to 98 mol % of ethylene units based on the sum of α-olefin and ethylene.

3. The composition according to claim 1, wherein the component B has a content of anhydride of 0.1% to 3.0% by weight.

4. The composition according to claim 1, wherein the component B is a maleic anhydride-functionalized copolymer of ethylene and 1-octene.

5. The composition according to claim 1, wherein the component B consists of 10 to 25 mol % of 1-octene units and 75 to 90 mol % of ethylene units based on the sum of 1-octene and ethylene.

6. The composition according to claim 1, wherein the component A consists solely of aromatic polycarbonate.

7. The composition according to claim 1, wherein talc is employed as component C.

8. The composition according to claim 1, consisting of
40% to 98.9% by weight of the component A,
0.1% to 10% by weight of the component B,
1% to 40% by weight of the component C,
0% to 20% by weight of polymer additives as component D.

9. The composition according to claim 1, wherein the component D comprises at least one stabilizer selected from the group of the phenolic antioxidants, phosphites and Brønsted acids.

10. A process for producing moulding materials, containing the steps (i), (ii) and optionally (iii), wherein in a first step (i)
a composition according to claim 1
is heated by introduction of thermal and/or mechanical energy, at least the component A) is thus melted and all employed components are dispersed and/or dissolved in one another
and
in a further step (ii)
the melt resulting from process step (i) is (ii) resolidified by cooling
and (iii) optionally pelletized,
wherein the process steps (ii) and (iii) may be performed in any desired sequence relative to one another.

11. The process according to claim 10, wherein the process is performed with a compounding unit and the component C is added separately from the other components.

12. The process according to claim 11, wherein the compounding unit used is a twin-screw extruder and the component C is added into a zone downstream of the melting zone for the other components via an ancillary intake.

13. A moulding material obtained by the process according to claim 10.

14. A method comprising utilizing the composition according to claim 1 for producing moulded articles.

15. A moulded article obtained from the composition according to claim 1.

* * * * *